United States Patent [19]

Flueckiger

[11] Patent Number: 5,145,294
[45] Date of Patent: Sep. 8, 1992

[54] MILLING CUTTER CAPABLE OF USING INDEXABLE INSERTS OF VARIOUS SHAPES

[75] Inventor: Rudolph H. Flueckiger, Fort Myers, Fla.

[73] Assignee: National Carbide Outlet, Inc., Fort Myers, Fla.

[21] Appl. No.: 669,766

[22] Filed: Mar. 15, 1991

[51] Int. Cl.⁵ .............................................. B26D 1/25
[52] U.S. Cl. ........................................ 407/42; 407/40; 407/113
[58] Field of Search .................. 407/33, 34, 40, 42, 407/53, 54, 57, 99, 113

[56] References Cited

U.S. PATENT DOCUMENTS

| | | | |
|---|---|---|---|
| 3,279,034 | 10/1966 | Kaiser | 407/113 |
| 3,279,035 | 10/1966 | Johnson | 407/113 |
| 3,762,005 | 10/1973 | Erkfritz | 407/113 |
| 4,294,565 | 10/1981 | Erkfritz | 407/113 |
| 4,618,296 | 10/1986 | Allaire et al. | 407/113 X |
| 4,692,070 | 9/1987 | Shikata | 407/113 X |

*Primary Examiner*—Larry I. Schwartz
*Assistant Examiner*—Julie R. Daulton
*Attorney, Agent, or Firm*—Leydig, Voit & Mayer

[57] ABSTRACT

A milling cutter includes a generally cylindrical body whose outer periphery is formed with angularly spaced pockets capable of accepting indexable cutting inserts of various shapes such as octagonal inserts, square inserts or round inserts. The cutting face of each insert defines a single shallow frusto-conical surface in order to impart a gradual curvature to the cutting edges. This geometry, together with the geometrical location of the inserts in the body, enables the cutter to cut in an extremely free manner and with high efficiency.

4 Claims, 2 Drawing Sheets

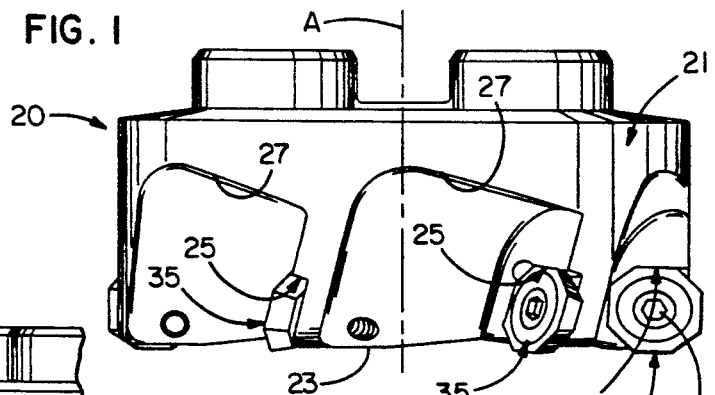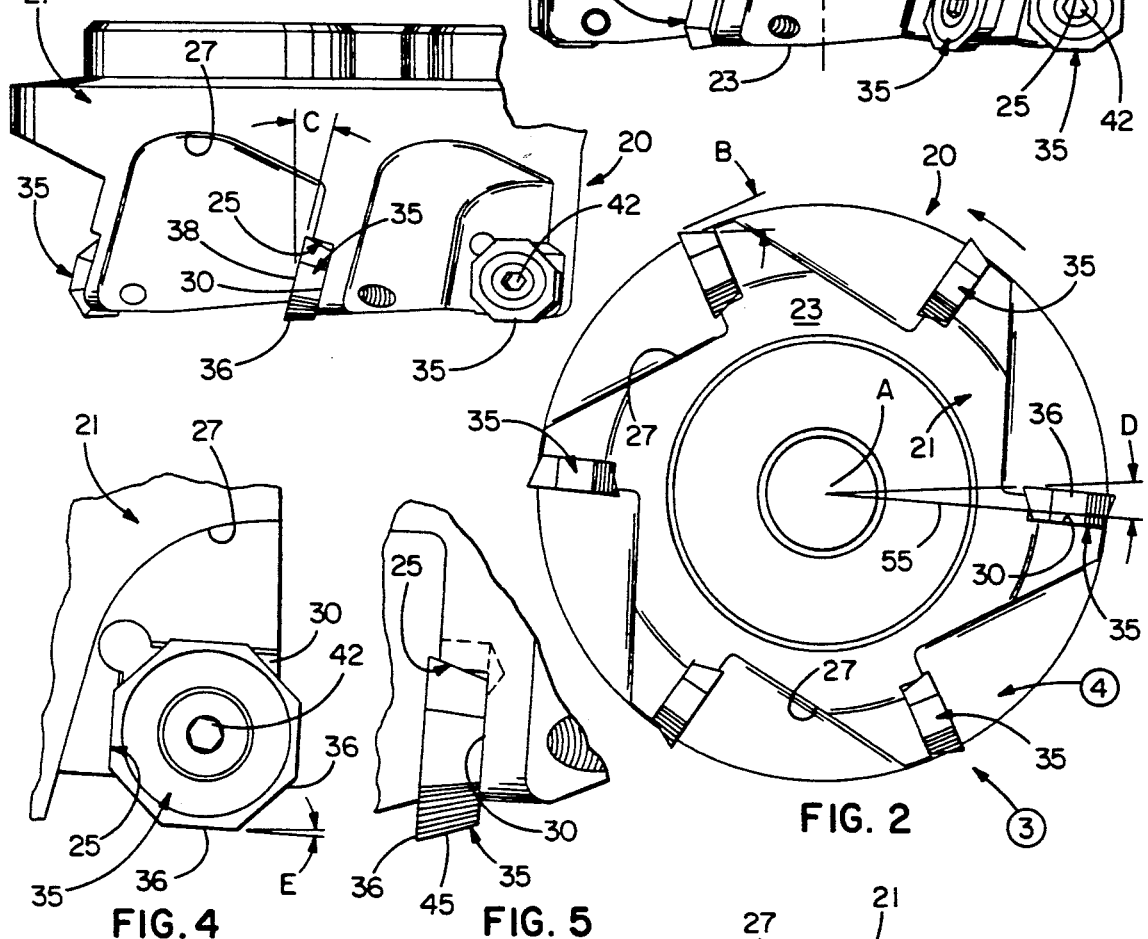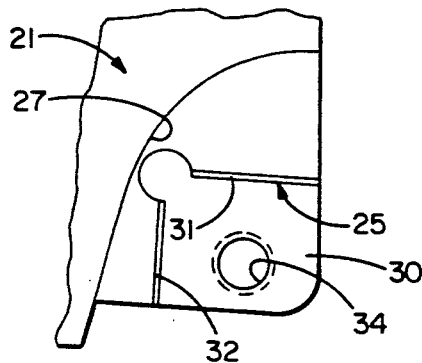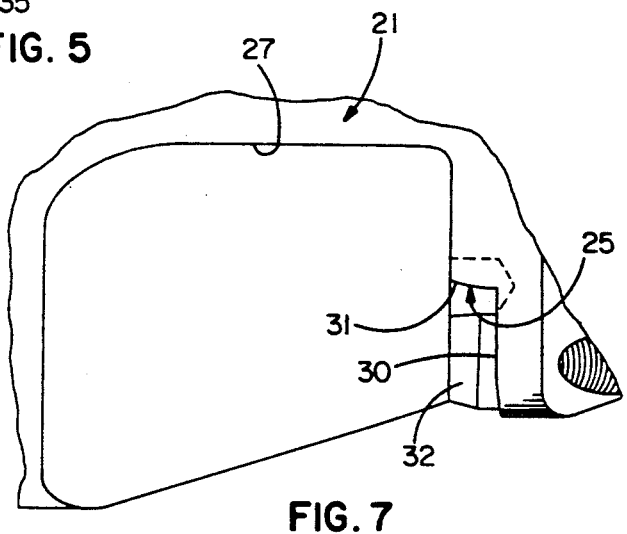

MILLING CUTTER CAPABLE OF USING INDEXABLE INSERTS OF VARIOUS SHAPES

BACKGROUND OF THE INVENTION

This invention relates to a milling cutter of the type in which indexable cutting inserts are removably secured in pockets spaced circumferentially around the periphery of a cutter body. Each cutting insert includes several alternately usable cutting edges. When one cutting edge becomes worn, the insert may be turned or indexed in the pocket in order to bring a fresh cutting edge into active cutting position.

Indexable cutting inserts are available in various shapes. One of the most common inserts is square and includes four cutting edges. Such an insert is especially useful in cases where it is necessary to mill a square or 90-degree shoulder in the workpiece being cut.

Octagonal inserts with eight cutting edges also are widely used. Adjacent cutting edges of such an insert extend at a 45-degree angle (commonly called a lead angle) relative to one another. Octagonal inserts are particularly advantageous in that a single insert possesses a relatively large number of alternately usable cutting edges.

Round inserts also are known. Such an insert may be infinitely indexed since the circular shape of the insert eliminates the requirement for indexing the insert through a particular angle. In addition to conventional round inserts, there are so-called hollow ground round inserts. The cutting face of a hollow ground insert is dished or relieved so as to produce an extremely sharp (albeit somewhat fragile) cutting edge on the insert.

Other inserts which are less widely used are irregularly shaped inserts having four cutting edges which are separated from one another by non-cutting edges. The cutting edges of a given insert may be located at a particular lead angle such as a 15-degree lead angle or a 30-degree lead angle.

A significant challenge in the field of milling cutters is to remove material at a fast rate and with a milling machine of relatively low horsepower. Many small milling machines (e.g., those known as Bridgeport mills) are rated at 1½ or 2 horsepower. In order to enable such machines to achieve a high rate of metal removal, it is necessary that the milling cutter cut through the metal in a relatively free manner.

SUMMARY OF THE INVENTION

The general aim of the present invention is to provide a new and improved milling cutter having a body which may be used universally with several different shapes of indexable inserts, the cutter being capable of achieving a comparatively high metal removal rate with relatively low power input.

A more detailed object of the invention is to achieve the foregoing through a unique geometry of both the pockets of the cutter and the cutting edges and cutting faces of the inserts, such geometry enabling the pockets to accept inserts of various shapes and enabling the inserts to move through the metal with an extremely free cutting action.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved cutter incorporating the unique features of the present invention.

FIG. 2 is a bottom plan view of the cutter.

FIG. 3 is a view similar to FIG. 1 but with the cutter rotated to a different position.

FIG. 4 is an enlarged face view of one of the inserts (specifically, an octagonal insert) and showing the insert positioned in its pocket.

FIG. 5 is an edge view of the insert illustrated in FIG. 4 and showing the insert located in its pocket.

FIGS. 6 and 7 are views generally similar to FIGS. 4 and 5, respectively, but with the insert removed from the pocket.

DETAILED DESCRIPTION OF THE PREFERRED EMBODIMENT

Figure 8:
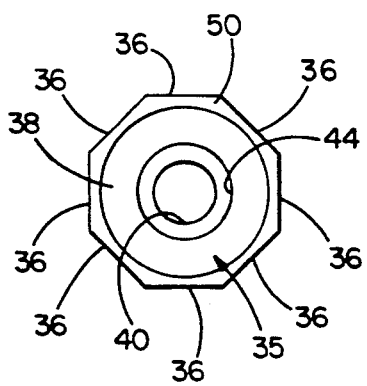
FIG. 8 is an enlarged face view of the octagonal insert.

For purposes of illustration, the invention has been shown in the drawings as embodied in a milling cutter 20 for milling the surface of a workpiece made of metal (e.g., steel or aluminum) in order to remove metal from the workpiece and to form the workpiece surface into a desired size and shape. The cutter includes a generally cylindrical body 21 made of steel and having a central axis A about which the body is adapted to be rotated. A bore is formed in the center of the body and receives a tool shank adapted to be coupled to the power-rotated spindle of a milling machine such as a Bridgeport mill.

The cutter body 21 includes a lower working end 23 which faces downwardly toward the workpiece. Formed in and spaced angularly around the outer periphery of the lower end portion of the body are several pockets 25 which, as will be explained subsequently, receive indexable inserts for performing the cutting operation on the workpiece. In this particular instance, the cutter 20 has an effective cutting diameter of 4" and is formed with six equally spaced pockets 25. Typical variations include 2", 3" and 6" diameter cutters with 3, 4 and 8 pockets, respectfully. A large gullet 27 is formed in the body 21 adjacent each pocket 25 to enable chips cut from the workpiece to flow away from the pockets and clear of the body.

In accordance with the present invention, the pockets 25 are uniquely configured to universally accept indexable inserts of various shapes and to locate the inserts in such a manner that, when taken with a novel cutting edge/cutting face configuration of the inserts, the cutter 20 is capable of removing material from the workpiece at a significantly faster rate than has been possible heretofore by a cutter with a given power input (e.g., 2 horsepower). By virtue of the body 21 being able to accept various shapes of inserts, the cutter 21 is versatile and avoids the need for small machine shops to stock a large number of different types of cutter bodies for different types of inserts. The high rate of metal removal effected by the cutter significantly increases efficiency.

More specifically, each pocket 25 includes a flat platform 30 (FIGS. 6 and 7) which faces generally circumferentially in the direction of rotation of the cutter 20. A generally radially extending locating surface or shoulder 31 is formed at the upper end of the pocket while a generally axially extending locating surface or shoulder 32 is located adjacent the inner side of the pocket. For a purpose to be explained subsequently, a tapped hole 34 is formed approximately at the center of the platform and extends at right angles thereto.

From the standpoint of cutting efficiency, the preferred inserts are octagonal inserts 35 and each includes eight angularly spaced cutting edges 36 (FIG. 8) of equal length. Each insert 35 is made from a wafer-like block of suitable cutting material such as tungsten carbide and includes a front face 38 and a generally parallel back face 39 (FIG. 9). A hole 40 (FIG. 8) extends between the faces 38 and 39 and through the insert 35 at the center thereof and is sized to receive the shank of a locking screw 42 (FIG. 4) having a frustoconical head. The screw is adapted to be threaded into the tapped hole 34 in the platform 30 to lock the insert 35 in the pocket 25. In order to prevent the head of the screw from interfering with the flow of chips from the workpiece, a frustoconical countersink 44 (FIG. 8) is formed in the front face 38 of the insert 35 around the hole 40 and enables the head to be flush with the front face.

In addition to the relatively wide front and back faces 38 and 39, each octagonal insert 35 includes eight comparatively narrow edge surfaces 45 (FIG. 9) which extend between the front and back faces and which define clearance faces. The clearance faces 45 are not perpendicular to the front and back faces 38 and 39 but instead are inclined at an angle B relative thereto for a purpose to be described subsequently.

Figure 9:
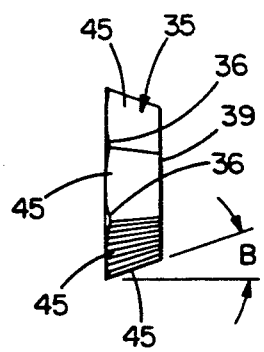
FIG. 9 is an enlarged edge view of the octagonal insert.
Figure 10:
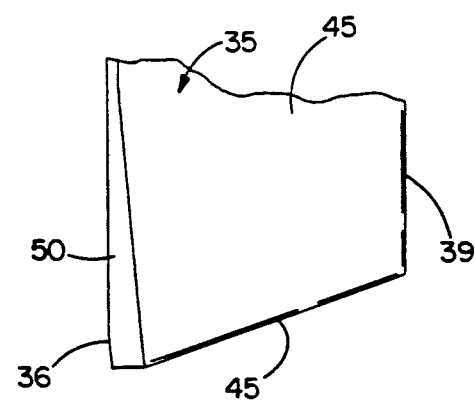
FIG. 10 is a greatly enlarged view of a portion of one cutting edge of the octagonal insert.

Each cutting edge 36 of each insert 35 is defined at the intersection of one of the clearance faces 45 with a cutting face 50 (FIG. 8). In most conventional wafer-type inserts, the cutting face is defined by the front face 38 and is flat and planar. According to the present invention, however, the cutting face 50 is defined by an annular and extremely shallow frustoconical surface whose apex lies along the axis of the hole 40. As a result of the frustoconical cutting face 50, the cutting edge 36 defined at the intersection of the cutting face with the clearance face 45 is not straight but instead exhibits a gradual curvature when viewed from the clearance face.

FIGS. 4 and 5 show an octagonal insert 35 seated in a pocket 25. When the insert is so seated, its lowermost cutting edge 36 is located in active cutting position and defines the active cutting edge of the insert. The adjacent edge 36 in an outward direction is inclined at a 45-degree angle relative to the lowermost or active cutting edge and its lowermost portion coacts with the active edge to cut the workpiece and to cause the edge of the cut to be formed as a shoulder which is inclined at an angle of about 45 degrees. In the installed position of the insert 35, its back face 39 is clamped against the platform 30 of the pocket 25 by the screw 42 while the clearance face 45 which is diametrically opposite the active cutting edge 36 is crowded into abutting engagement with the shoulder 31 of the pocket. The radially innermost clearance face 45 of the insert is forced against and is backed by the shoulder 32 of the pocket.

As shown in FIG. 3, the platform 30 of each pocket 25 is inclined vertically relative to the axis A of the cutter 20 so as to cause the active cutting edge 36 of each insert 35 to be disposed at a positive axial rake angle C of about 15 degrees. That is to say, the angle C causes the front face 38 of the insert to be located in a plane which lies behind and is inclined rearwardly from a plane containing the active cutting edge 36 and disposed parallel to the axis A of the cutter 20. The platform also is offset or inclined relative to a radius of the body 21 so as to cause the active cutting edge to be disposed at a negative radial rake angle D (FIG. 2). In other words, the cutting edge 36 is positioned ahead of a radial line 55 that extends parallel to the active cutting edge. In a cutter with an effective diameter of 4", the radial rake angle D may typically be 5½ degrees.

In addition to each platform 30 being positioned to locate the insert 35 at a positive axial rake angle C and a negative radial rake angle D, the shoulders 31 and 32 of each pocket 25 are inclined so as to cause the active cutting edge 36 to dish at an angle E (FIG. 4) of about 0.75 degrees in the case of the 4" cutter which has been illustrated. This is achieved by inclining the locating shoulder 31 such that the shoulder progresses toward the lower end 23 of the body 21 as the shoulder proceeds outwardly. The locating shoulder 32 is inclined relative to vertical at a similar angle so as to cause the two shoulders to intersect one another at a right angle. By virtue of the inclination of the shoulders 31 and 32, the active cutting edge 36 is inclined downwardly and outwardly at the angle E. This raises the inner end or heel of the active cutting edge from the workpiece and leaves the heel unworn so that it presents a fresh edge when the insert is indexed.

During cutting, the inclined lower clearance face 45 of the active cutting edge 36 of each insert 35 progresses away from the working end 23 of the body 21 at the angle B as the clearance face proceeds from the front face 38 of the insert toward the back face 39 thereof. This prevents the lower clearance face from rubbing against the upwardly facing surface of the workpiece. The clearance face of the adjacent cutting edge in an outward direction also is prevented from rubbing against the shoulder of the workpiece by virtue of the clearance angle B (see FIG. 2).

When the active cutting edge 36 of each octagonal insert 35 becomes worn to the point of ineffectiveness, the screw 42 is removed and the insert is indexed 45 degrees to bring an unworn edge into active cutting position. With the octagonal inserts 35, each insert may be indexed to eight different positions before replacement of the insert is necessary.

Figure 11:
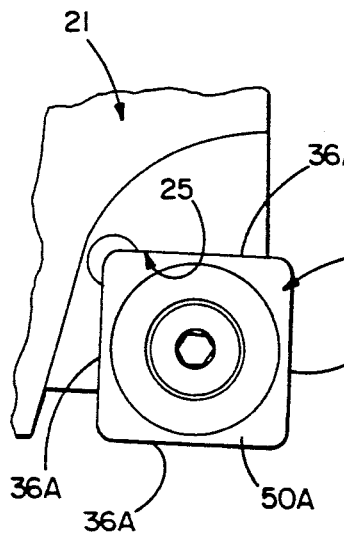
FIGS. 11 and 12 are views generally similar to FIGS. 4 and 5, respectively, but show a square insert positioned in the pocket.
Figure 12:
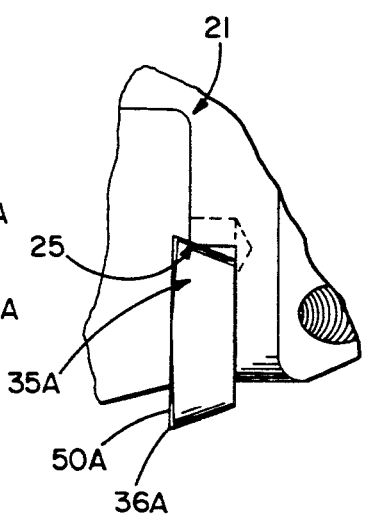

A significant advantage of the present cutter 20 is that the body 21 is not limited to use with octagonal inserts 35. Thus, each pocket 25 may be equipped with a square insert 35A as shown in FIGS. 11 and 12. Such an insert includes four available cutting edges 36A and, when utilized, forms a 90-degree shoulder at the edge of the cut. The square inserts 36A are advantageous when it is necessary to form the workpiece with such a shoulder or when it is necessary to mill a surface which is located adjacent a pre-existing 90-degree shoulder. The cutting face 50A of the square insert 35A is shaped as a shallow frustum, as in the case of the octagonal insert 35, so as to impart a very gradual curvature to each cutting edge 36A of the insert.

Figure 13:
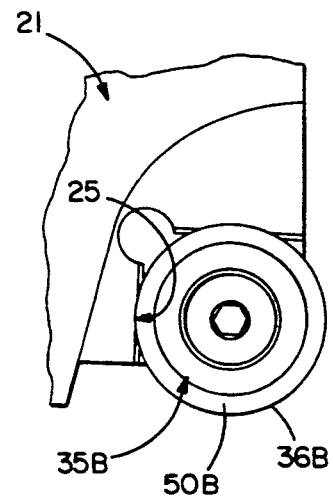
FIG. 13 is a view generally similar to FIG. 4 but shows a round insert positioned in the pocket.

The insert 35B shown in FIG. 13 is round, is formed with a circular cutting edge 36B and, like the inserts 35 and 35A, is formed with a shallow frustoconical cutting face 50B. The pockets 25 accept and locate the round inserts 35B and, when utilized, the round inserts present an infinitely indexed through any desired angle and is not limited to being indexed through a finite angle.

Figure 14:
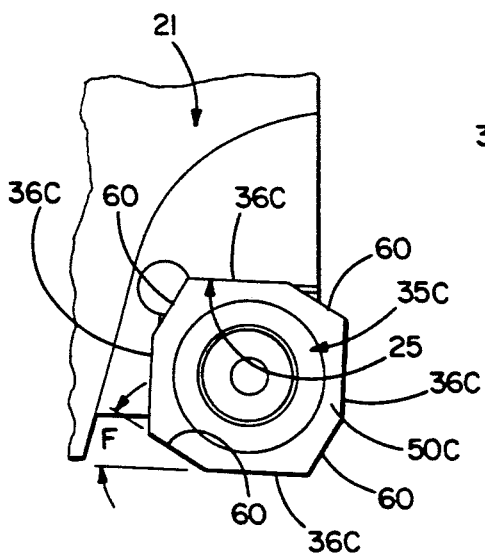
FIG. 14 also is a view generally similar to FIG. 4 but shows an insert with a 30-degree lead angle positioned in the pocket.

Still another insert 35C capable of being used in the pockets 25 is shown in FIG. 14 and is referred to as being a 30-degree lead angle insert. Such an insert includes four angularly spaced cutting edges 36C and four intervening edges 60 each located at a 30-degree lead angle F relative to the cutting edge. The lead angle causes the insert to mill a 60-degree shoulder in the workpiece. Again, the cutting face 50C of the insert is frustoconical to impart curvature to the cutting edges 36C. It will be appreciated that the lead angle F may be of a value of other than 30 degrees, for example, 15 degrees.

Figure 15:
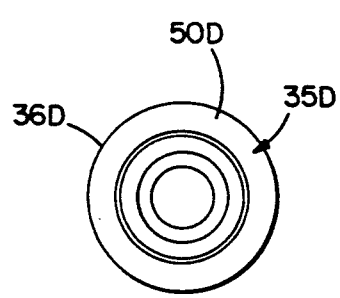
FIG. 15 is a view generally similar to FIG. 8 but shows a hollow ground round insert.
Figure 16:
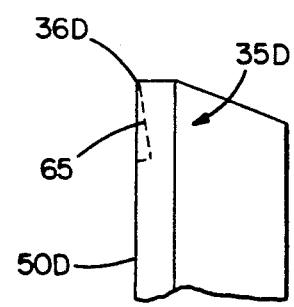
FIG. 16 is an enlarged cross-sectional view of the cutting edge structure of the insert shown in FIG. 15.

FIGS. 15 and 16 illustrate a so-called hollow ground round insert 35D which is similar to the round insert 35B except that the cutting face 50D is flat and planar rather than being frustoconical. Moreover, the cutting face 50D is dished or relieved t approximately a 10-degree shear angle as indicated at 75 in FIG. 16 so as to cause the cutting edge 36D to be extremely sharp. The hollow ground insert 35D is especially useful in milling material such as titanium, Inconel and the like.

From the foregoing, it will be apparent that all of the inserts 35, 35A, 35B, 35C and 35D may be used interchangeably in the pockets 25 of the cutter body 21. Thus, the user of the cutter 20 need not stock different cutter bodies for different types of inserts but instead may use the same body with all of the inserts. This results in a significant cost saving.

The cutter 20 also is highly efficient and particularly with the octagonal inserts 35 and the round inserts 35B. It is believed that the increased efficiency of the present cutter as compared with prior cutters results from the combined effect of the angles B, C, D and E together with the frustoconical cutting faces and gradually curved cutting edges of the inserts. As a result of these geometrical considerations, actual cutting first occurs at the cutting face rather than at the cutting edge in spite of the positive axial rake angle C, and the cutting force or chip load is applied primarily to the cutting face as opposed to being applied primarily to the cutting edge itself. The cutter moves through the workpiece with an extremely free cutting action and with an extremely free flow of chips along the front faces of the inserts. Such free flow is promoted by virtue of the flush heads of the screws 42 and the absence of clamps or other obstructions in front of the inserts.

I claim:

1. A milling cutter comprising a generally cylindrical cutter body having a central axis and adapted to be rotated in a predetermined direction about said axis, said body having an outer periphery and a working end and having a plurality of circumferentially spaced pockets around the outer periphery of the working end, an indexable cutting insert within each of said pockets and having a plurality of alternately usable cutting edges around its periphery, screw means extending through each insert to secure each insert in its respective pocket and selectively releasable to permit indexing of the insert in the pocket in order to bring a selected one of said cutting edges into active cutting position, each of said inserts having a leading and circumferentially facing cutting face and a trailing and oppositely facing back face, and each having clearance faces extending between said cutting face and said back face, said screw means leaving said cutting face unobstructed, the cutting edges of each insert being defined at the junction of the cutting face of the insert with the clearance faces thereof, the cutting face of each insert defining a single shallow frustoconical surface adjacent the junction of the cutting face with the cutting edges whereby each cutting edge has a curved configuration when viewed from the respective clearance face, the clearance face of each cutting edge facing generally axially and in the direction of the working end of the body when such cutting edge is in said active cutting position, the clearance face of each cutting edge being inclined such that the clearance face of each active cutting edge progresses away from the working end of said body as such clearance face proceeds from the cutting face of the insert toward the back face thereof, each of said pockets being positioned so as to locate the active cutting edge of each insert at a positive axial rake angle and at a negative radial rake angle, and each of said pockets having a generally radially extending locating surface engageable with the clearance face diametrically opposite the clearance face of the active cutting edge of the respective insert, said locating surface being inclined and progressing toward the working end of the body as such surface proceeds generally radially outwardly.

2. A milling cutter as defined in claim 1 in which each of said inserts includes eight alternately usable cutting edges and is generally octagonal in shape.

3. A milling cutter as defined in claim 1 in which each of said inserts is generally circular in shape.

4. A milling cutter as defined in claim 1 in which each of said inserts includes four alternately usable cutting edges and is generally square in shape.

* * * * *